Patented Mar. 30, 1937

2,075,100

UNITED STATES PATENT OFFICE 2,075,100

DEHYDROGENATION OF ALIPHATIC ETHERS

Henry Dreyfus, London, England

No Drawing. Application April 18, 1933, Serial No. 666,654. In Great Britain April 30, 1932

12 Claims. (Cl. 260—106)

This invention relates to improvements in the manufacture of oxygenated organic compounds, and is particularly concerned with their manufacture from ethers.

I have found that ethers may be converted by catalytic oxidation and/or dehydrogenation into aldehydes, acids, acid anhydrides, esters and other oxygenated organic compounds, depending on the character of the ether which is used as starting material. I prefer to amploy as starting materials the ethers corresponding with primary aliphatic alcohols, such as methyl alcohol, ethyl alcohol, propyl alcohol and the like. Preferably symmetrical ethers, such as dimethyl ether, diethyl ether, dipropyl ether and the like are used, since this facilitates the working up of the products of the reaction. According to the invention the diethyl ether in particular is subjected to processes of catalytic oxidation and/or dehydrogenation.

Preferably the oxidation and/or dehydrogenation is carried out in the vapour phase, the vapours of the ether, with or without inert diluents, such as inert gases, and with or without air or oxygen or oxidizing gases, being passed over or otherwise in contact with the catalyst which is preferably a solid catalyst. Where the reaction is to be one of simple oxidation, air, oxygen or other oxidizing gas may be mixed with the ether vapours and passed over the heated oxidation catalyst in a suitable reaction chamber. The oxidation catalyst employed may be comparatively mild in action, particularly where the reaction products desired are reaction products of an intermediate stage of oxidation, such as the aldehydes. Thus platinum black is in general too violent in action, except where the ultimate organic products of oxidation, and particularly the acids and anhydrides, are desired in a single stage operation. On the other hand, platinum in the state of fine wire or thin foil may be used or palladium black or other noble metal catalysts, such as gold and silver. Copper, cobalt, manganese, aluminium and nickel, and likewise their oxides, and in addition the sesqui-oxides of iron, chromium and uranium and vanadium pentoxide are very suitable.

The catalysts may be and preferably are deposited on suitable supports which may be arranged on trays or otherwise in the reaction chambers or tubes. Thus asbestos, pumice, and the like may be used as carriers, particularly for metal and metal oxide catalysts. The carrier may be suitably impregnated with a solution of a soluble compound of the metal, and the compound subsequently decomposed, after drying if necessary, into the required metal or metal oxide catalyst. In some cases it is possible to use as a carrier a substance of the same chemical character as the catalyst itself. Thus, for instance, copper gauze may be suitably impregnated with a copper salt, the copper salt precipitated to form the hydroxide, as for example by treatment with an alkali or an alkali carbonate, and the copper hydroxide reduced with hydrogen or other reducing gases so as to obtain the copper gauze impregnated with reduced copper catalyst. When carrying out the reaction in this manner by the use of air, oxygen or other oxidizing gas to bring about the oxidation, I prefer to use reduced copper as the catalyst.

The temperature of the catalytic oxidation may be adjusted in accordance with the desired product. Thus, I find it preferable to carry out the oxidation of diethyl ether at 200–350° C., or at least not to exceed 400° C. By this means considerable oxidation to acetaldehyde is produced without substantial decomposition of the aldehyde. By pressing the oxidation still further, quantities of acetic acid, acetic anhydride and ethyl acetate may be produced.

The nature of the product may also be influenced by the relative proportions in which the reactants are employed. When an aldehyde, for example acetaldehyde from diethyl ether, is to be the main product, it is preferable not to employ more than one volume of oxygen to each volume of ether vapour, while the use of lower proportions of oxygen may be advantageous. Thus, vaporized diethyl ether may be used in admixture with between its own volume and half this amount of oxygen, or with the corresponding quantity of air or other gas mixture containing free oxygen. When more highly oxidized products are desired, the amount of oxygen used may with advantage be increased, and amounts even exceeding twice the volume of ether vapour may be employed. Preferably, however, large excess of oxygen is to be avoided.

As an alternative to carrying out the oxidation of the ether by the use of air, oxygen or other oxidizing gas together with the ether vapour, the reaction may be conducted as a simple dehydrogenation by using a dehydrogenation catalyst. Even in this case it is sometimes desirable to add to the ether vapour small quantities of an oxidizing gas in order to regenerate the catalyst. Some of the same catalysts as those referred to above for an oxidation reaction may be employed in this dehydrogenation. Thus, for instance, reduced copper prepared for example as already described may be used to carry out the dehydrogenation of diethyl ether so as to yield aldehyde and, according to the amount of air or oxygen used, proportions of acetic acid and acetic anhydride. Other catalysts which may be used are reduced nickel, reduced cobalt or iron, zinc, copper-zinc alloys and oxides of uranium, molybdenum, zinc, vanadium, tin and cadmium.

The temperature at which the dehydrogenation may be carried out varies somewhat with the nature of the catalyst which is being used. Thus, for instance, using a reduced copper catalyst temperatures up to 300 or 350° C. are desirable, while considerably lower temperatures may be used with reduced nickel as a catalyst. Iron, zinc and cobalt may be used at considerably higher temperatures, for example up to 650° C. without substantial decomposition of the products of reaction.

As previously indicated, the reaction may be carried out either as a direct oxidation using an oxidation catalyst and an oxidizing substance, such as oxygen or air, or as a simple dehydrogenation process in the vapour phase, or alternatively these two processes may be combined and if desired the reaction may be effected with two different types of catalysts successively or simultaneously. For example, a direct dehydrogenation may be followed by an oxidation either in the liquid or vapour phase, particularly where the desired products are acetic acid or acetic anhydride or other acid or anhydride corresponding with the ether used as the starting material. Similarly, by using a catalyst which can act both as an oxidizing catalyst and a dehydrogenation catalyst, the two reactions of dehydrogenation and oxidation may take place simultaneously or consecutively, and the ultimate extent of the oxidation depends upon the amount of air or oxidizing gas which is mixed with the ether vapour initially. I do not limit myself to any particular proportion of oxidizing gas which is to be mixed with the ether vapour, since very small proportions may act simply to regenerate the catalyst, somewhat larger proportions may be used to carry out an oxidation at the same time as or subsequent to a dehydrogenation, or relatively large quantities may effect an oxidation pure and simple.

As a further modification water vapour, particularly in small quantities, may be mixed with the reagents for carrying out the reaction, and furthermore, if desired a hydration catalyst, for example titanium oxide, thorium oxide, aluminium oxide or zinc oxide, may be used in advance of the dehydrogenation or oxidation catalyst or may be mixed therewith. I find that this is particularly advantageous when the oxidation is to be carried to the stage at which an acid or an acid anhydride is produced, and in which it is desired to decrease the amount of anhydride as much as possible. Similarly, where, as is sometimes the case, the product of reaction is an ester formed by combination of the acid of oxidation with the alcohol corresponding with the ether used as starting material, the presence of water in the reaction gases may facilitate the splitting of such ester to the corresponding alcohol and acid.

Any of the processes described above may be carried out at ordinary atmospheric pressure, under reduced pressure or with increased pressure.

The ethers for use in accordance with the present invention may be derived from any desired source. Usually a very convenient source is from ethylene, propylene or other olefines obtained in the cracking of oils, and particularly petroleum oils. Such olefines may be absorbed in sulphuric acid or other suitable hydrating agent, and the ether may be distilled from the resulting ethyl hydrogen sulphate or other reaction product in a manner known in the art, the proportion of water added to the ethyl hydrogen sulphate-sulphuric acid mixture or like mixture being adjusted so as to obtain the ether. The gases resulting from such distillation may be used directly without condensation or purification for the purposes of the present invention.

Where aldehydes are the main products of the oxidation or dehydrogenation of the present invention, they may be used directly for the manufacture of acids or anhydrides therefrom, for example by an oxidation carried out in the liquid or vapour phase, for instance the well-known oxidation of acetaldehyde to acetic acid in the liquid phase using a salt of manganese or other suitable catalyst. Such oxidation may be carried out either continuously or discontinuously with the manufacture of the aldehyde in accordance with the invention. Where the product of reaction contains mixtures of aldehyde and acid and/or acid anhydride, the whole mixture may be treated so as to complete the oxidation to the acid or acid anhydride, or alternatively the acid or anhydride may be condensed out of the reaction gas and the aldehyde separately subjected to such further oxidation. Again, if the acid anhydride be the product which is desired, the acid, if an acid be present in the product, or aldehyde after oxidation to the acid, may be subjected to pyrogenic decomposition in accordance with the methods known in the art for the manufacture of the anhydride, and such process may be carried out continuously with the oxidation or dehydrogenation of the invention. Thus, for instance, if the main product of the reaction is an aldehyde, a subsequent oxidation step to the acid may be carried out, and this acid or an acid which is the main product of the invention may be heated and carried directly through a decomposition chamber for the manufacture of the anhydride. Such chamber may contain any suitable catalysts adapted to promote the pyrolysis of the acid, for example phosphoric acid or acid phosphates alone or mixed with promoters, such as a copper promoter, or other salts of phosphoric acid, such as the metaphosphates, or tungstates or other catalysts suitable for this pyrogenic decomposition. Esters resulting from the reaction may if desired be subjected to saponification processes, either by passage with steam over suitable hydration catalysts, as for example those mentioned previously and particularly thorium oxide, or by a liquid phase hydrolysis. They may be subjected to the type of saponification which yields only the ether and the acid or the ether and the anhydride, see for example U. S. Patent No. 1,864,531. Such saponification may be promoted by the use of a phosphoric acid or an acid phosphate. The ether obtained in such reaction may be returned to the oxidation or dehydrogenation treatment characteristic of the present invention. Esters may further be treated directly with carbon monoxide to produce an acid in accordance with the processes described in U. S. Patent No. 1,864,643.

The oxidation which is the subject of the invention may comprise the addition of oxygen to or the subtraction of hydrogen from the starting materials, or it may comprise both these reactions, and catalysts favouring either or both of these reactions are termed in the claims "oxidation catalysts".

What I claim and desire to secure by Letters Patent is:—

1. Process for the manufacture of oxygenated organic compounds which comprises contacting an aliphatic ether in the vapor phase with a dehydrogenation catalyst, which is without substantial dehydrating action and having a high surface/volume ratio, at a temperature above 200° C. in the presence of at most a small quantity of an oxidizing gas.

2. Process for the manufacture of oxygenated organic compounds which comprises contacting an aliphatic ether in the vapor phase at a temperature between 200 and 650° C. with a catalyst having a high surface/volume ratio selected from the group of dehydrogenation catalysts which consists of iron, zinc and cobalt in the presence of at most a small quantity of an oxidizing gas.

3. Process for the manufacture of oxygenated organic compounds, which comprises contacting an aliphatic ether in the vapor phase at a temperature between 200° and 650° C. with a metal having an atomic number of 26 to 30 and which has a high surface/volume ratio, in the presence of at most a small quantity of an oxidizing gas.

4. Process for the manufacture of oxygenated organic compounds, which comprises contacting an aliphatic ether in the vapor phase at a temperature between 200 and 650° C. with a hydration catalyst and a metal of atomic number 26 to 30 in a form having a high surface/volume ratio, in the presence of at most a small quantity of an oxidizing gas.

5. Process for the manufacture of oxygenated organic compounds, which comprises contacting an aliphatic ether in the vapor phase at a temperature between 200 and 350° C. with reduced copper which has a high surface/volume ratio, in the presence of at most a small quantity of an oxidizing gas.

6. Process for the manufacture of oxygenated organic compounds, which comprises contacting an aliphatic ether in the vapor phase at a temperature between 200 and 350° C. with reduced nickel which has a high surface/volume ratio, in the presence of at most a small quantity of an oxidizing gas.

7. Process for the manufacture of oxygenated organic compounds which comprises contacting an aliphatic ether in the vapor phase in admixture with a small amount of oxygen with a dehydrogenation catalyst, which is without substantial dehydrating action and having a high surface/volume ratio, at a temperature above 200° C.

8. Process for the manufacture of oxygenated organic compounds which comprises contacting an aliphatic ether in the vapor phase with a dehydrogenation catalyst, which is without substantial dehydrating action and having a high surface/volume ratio, and a hydration catalyst at a temperature above 200° C. in the presence of at most a small quantity of an oxidizing gas.

9. Process for the manufacture of oxygenated organic compounds which comprises contacting an aliphatic ether in the vapor phase with a dehydrogenation catalyst, which is without substantial dehydrating action and having a high surface/volume ratio, and a hydration catalyst at a temperature above 200° C. in the presence of at most a small quantity of an oxidizing gas and of water vapor.

10. Process for the manufacture of oxygenated organic compounds, which comprises contacting the vapor of diethyl ether at a temperature between 200 and 350° C. with reduced copper which has a high surface/volume ratio, in the presence of at most a small quantity of an oxidizing gas.

11. Process for the manufacture of oxygenated organic compounds, which comprises contacting the vapor of diethyl ether at a temperature between 200 and 350° C. with reduced nickel which has a high surface/volume ratio, in the presence of at most a small quantity of an oxidizing gas.

12. Process for the manufacture of oxygenated organic compounds which comprises contacting the vapor of diethyl ether with a catalyst having a high surface/volume ratio selected from the group of dehydrogenation catalysts which consists of iron, zinc and cobalt at a temperature between 200 and 650° C. in the presence of at most a small quantity of an oxidizing gas.

HENRY DREYFUS.